US007752710B2

(12) United States Patent
Lin

(10) Patent No.: US 7,752,710 B2
(45) Date of Patent: Jul. 13, 2010

(54) SLIDING HINGE

(75) Inventor: Ming-Han Lin, Taipei Hsien (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 279 days.

(21) Appl. No.: 11/958,203

(22) Filed: Dec. 17, 2007

(65) Prior Publication Data

US 2009/0151120 A1 Jun. 18, 2009

(51) Int. Cl.
*H04M 1/00* (2006.01)

(52) U.S. Cl. ..................................... 16/334; 455/575.4

(58) Field of Classification Search .................. 16/362; 379/433.12; 188/290, 306; 74/574.2; 455/575.4
See application file for complete search history.

(56) References Cited

U.S. PATENT DOCUMENTS

| | | | | |
|---|---|---|---|---|
| 4,635,763 | A * | 1/1987 | Omata | 188/268 |
| 5,133,433 | A * | 7/1992 | Oosawa | 188/290 |
| 7,032,985 | B1 * | 4/2006 | Ichioka et al. | 312/319.2 |
| 7,599,721 | B2 * | 10/2009 | Taki et al. | 455/575.1 |
| 2005/0215298 | A1 * | 9/2005 | Lee | 455/575.4 |
| 2006/0025184 | A1 * | 2/2006 | Cho et al. | 455/575.4 |
| 2006/0030381 | A1 * | 2/2006 | Byun et al. | 455/575.4 |
| 2006/0068859 | A1 * | 3/2006 | Lee et al. | 455/575.4 |
| 2006/0142073 | A1 * | 6/2006 | Gordecki | 455/575.4 |
| 2007/0155451 | A1 * | 7/2007 | Lee | 455/575.4 |
| 2007/0218963 | A1 * | 9/2007 | Kim | 455/575.4 |
| 2008/0058039 | A1 * | 3/2008 | Lee et al. | 455/575.4 |
| 2008/0120806 | A1 * | 5/2008 | Liu | 16/277 |
| 2008/0194304 | A1 * | 8/2008 | Satoshi et al. | 455/575.4 |
| 2008/0301909 | A1 * | 12/2008 | Chien et al. | 16/362 |
| 2009/0211057 | A1 * | 8/2009 | Yamaguchi et al. | 16/362 |
| 2009/0231785 | A1 * | 9/2009 | Li et al. | 361/679.01 |

* cited by examiner

*Primary Examiner*—Victor Batson
*Assistant Examiner*—Matthew Sullivan
(74) *Attorney, Agent, or Firm*—WPAT, P.C.; Anthony King

(57) ABSTRACT

The present invention relates to a sliding hinge. The sliding hinge includes a basic body, a sliding body slidably coupling with the basic body and a pushing component placed between the basic body and the sliding body. The pushing component has a torsion spring and a damping plate. The torsion spring has a first elastic arm and a second elastic arm, a free end of the first elastic arm is pivotably connected to the basic body, a free end of the second elastic arm is pivotably connected to the sliding body. The damping plate is pivotably mounted on the sliding body. The damping plate defines a stopping portion, the stopping portion has two stopping ends alternately engaging with the second elastic arm for providing a damping force to the second elastic arm when a stored elastic force of the torsion spring is released.

9 Claims, 7 Drawing Sheets

SLIDING HINGE

BACKGROUND OF THE INVENTION

1. Field of the Invention

The present invention relates to a hinge, and more particularly to a sliding hinge mainly applied in a slide type electronic device.

2. The Related Art

To facilitate people's work, study and communication, a variety of electronic devices, such as cellular phone, electronic dictionary, PDA and MP4, are manufactured in the past few years. These electronic devices are generally provided with audio-visual function. To make images clearer, the interface of the electronic device should be as big as possible. However, to be convenient for being carried, the electronic device should be as small as possible. To address the problem mentioned above, the electronic device is designed to have two parts sliding relatively via a sliding hinge in recent years. The two parts of the electronic device are opened when the electronic device is in use, and the two parts of the electronic device are closed when the electronic device is not in use.

Generally, the sliding hinge used at present has a spring. When the sliding hinge is opened or closed over a certain position where the spring has a maximum deformation, the electronic device with the sliding hinge can fully open or fully close automatically under the spring force.

However, when the electronic device with the sliding hinge automatically opens or closes under the spring force, the speed of opening or closing gets more and more quick. As a result, the two parts of the electronic device impact each other to produce shock when the two parts open or close completely. On one hand, the shock of the two parts affects the own performance of the electronic device. On the other hand, the electronic device may also fall down if the user uses carelessly.

SUMMARY OF THE INVENTION

Accordingly, an object of the present invention is to provide a sliding hinge which can reduce the shock when a slide type electronic device with the sliding hinge is opened or closed.

The sliding hinge includes a basic body, a sliding body slidably coupling with the basic body and a pushing component placed between the basic body and the sliding body. The pushing component has a torsion spring and a damping plate. The torsion spring has a first elastic arm and a second elastic arm, a free end of the first elastic arm is pivotably connected to the basic body, a free end of the second elastic arm is pivotably connected to the sliding body. The damping plate is pivotably mounted on the sliding body. The damping plate defines a stopping portion, the stopping portion has two stopping ends alternately engaging with the second elastic arm for providing a damping force to the second elastic arm when a stored elastic force of the torsion spring is released.

As described above, when the slide type electronic device is opened or closed, the damping plate disposed between the basic body and the sliding body is pushed to rotate by the second elastic arm. The damping force produced in the rotating process of the damping plate to limit the rotating speed of the damping plate, then the movement trend of the torsion spring is limited. Therefore, the slide type electronic device can be opened or closed softly and steadily, avoiding a shock between an upper housing and a lower housing thereof.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENTS

Figure 1:
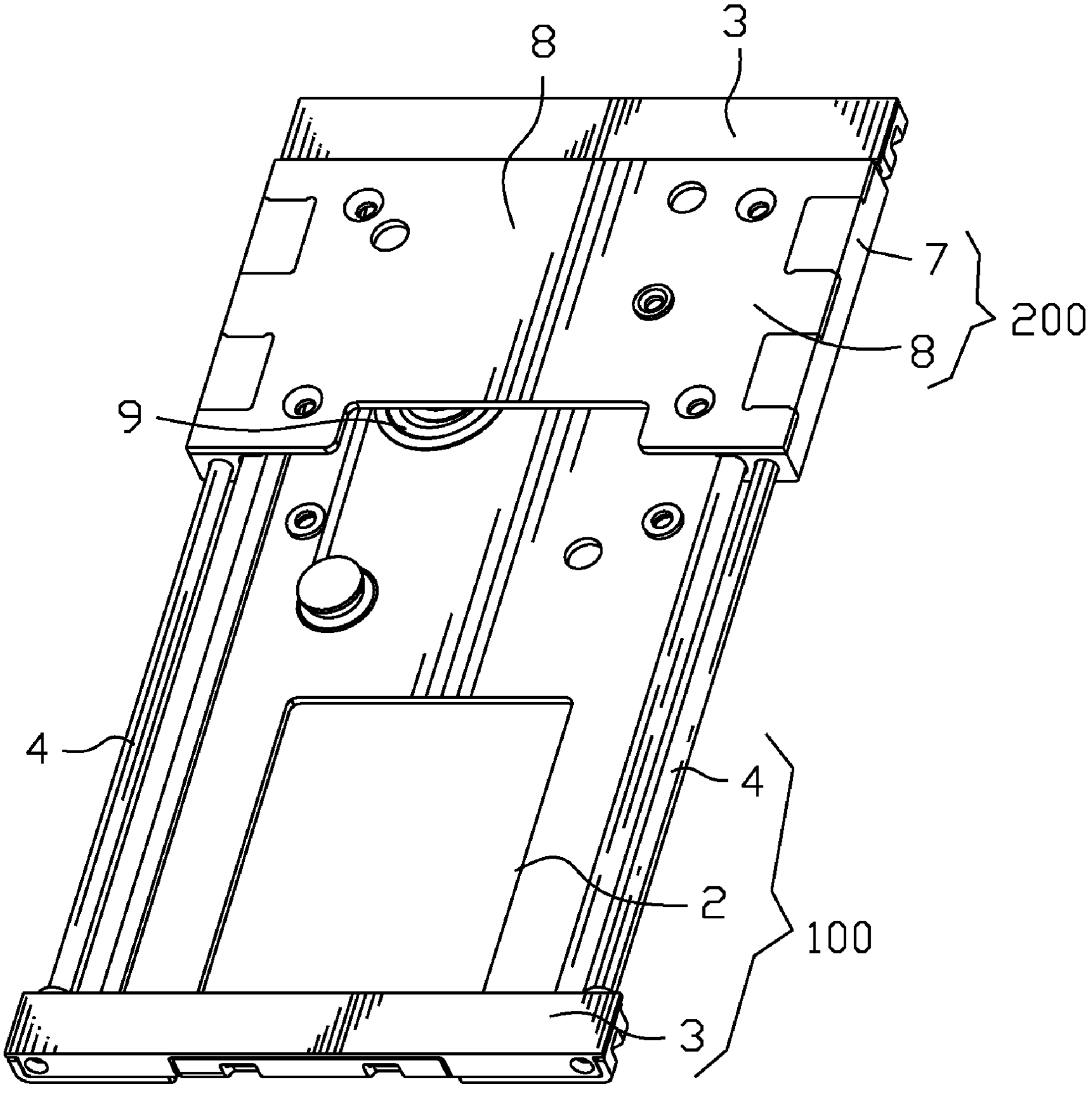
FIG. 1 is a perspective view of a sliding hinge according to the present invention.
Figure 2:
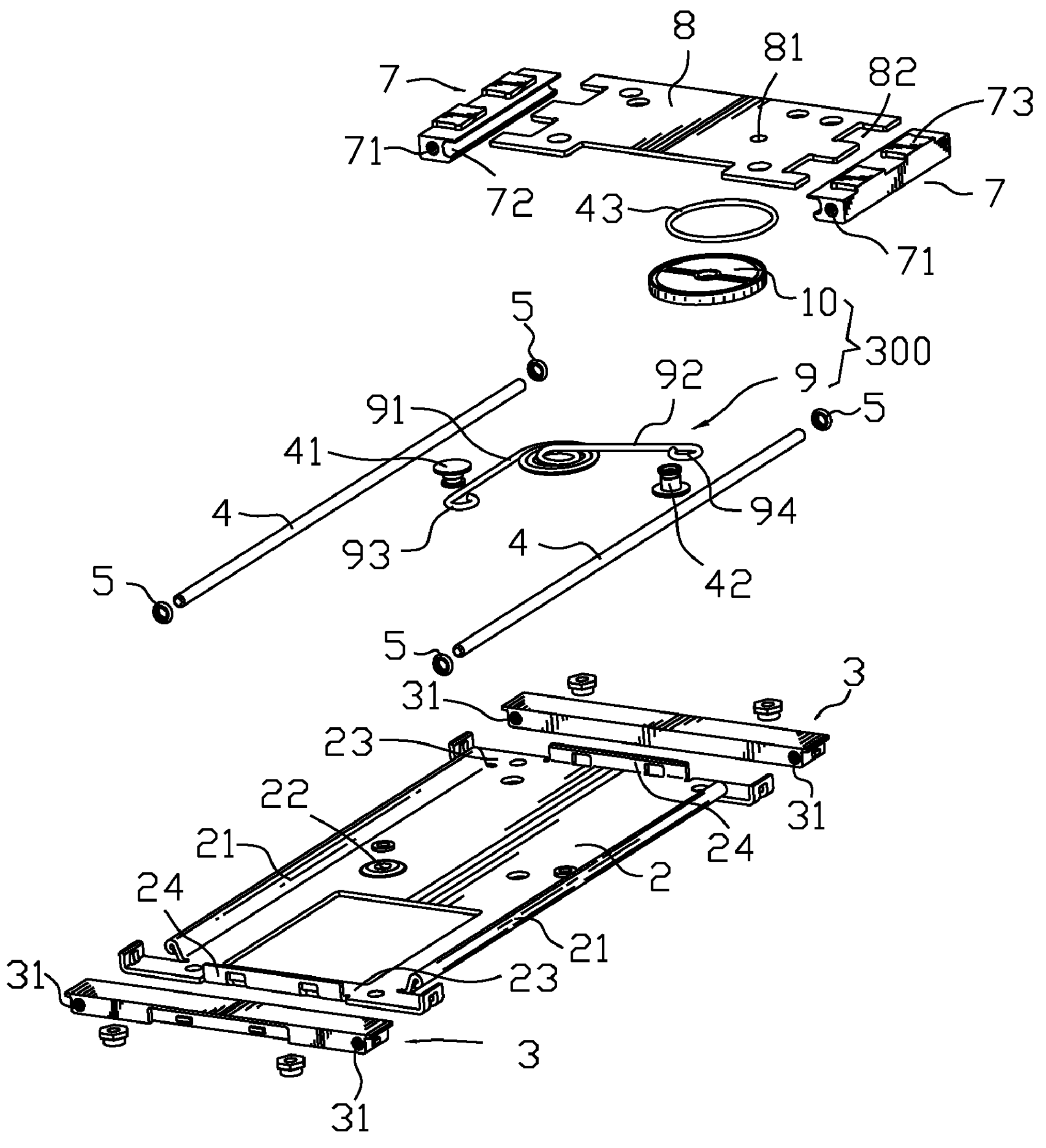
FIG. 2 is an exploded view of the sliding hinge shown in FIG. 1.

With reference to FIG. 1 and FIG. 2, a sliding hinge of the present invention includes a basic body 100 fixed to a lower housing of a slide type electronic device (not shown), a sliding body 200 slidably coupling with the basic body 100 fixed to an upper housing of the slide type electronic device, and a pushing component 300 placed between the basic body 100 and the sliding body 200.

The basic body 100 has a basic plate 2 of rectangular shape and two supporting members 3 placed transversely. Two sides of the basic plate 2 curl inward to form two side portions 21. The basic plate 2 defines a first hole 22 near to one of the side portions 21. Both ends of the basic plate 2 define a limit portion 23 respectively. Both ends of the limit portion 23 respectively extend outward to exceed the side portions 21 and then bend upward. A baffle plate 24 extends upward from the margin of the limit portion 23. The supporting member 3 is bar-shaped and defines two guiding holes 31 respectively adjacent to two ends thereof and passing through the supporting member 3 longitudinally. The supporting member 3 is received in the corresponding limit portion 23 of the basic plate 2 and blocked by the corresponding baffle plate 24.

The sliding body 200 includes two sliding blocks 7 and a sliding plate 8. The sliding block 7 defines a sliding hole 71 passing therethrough longitudinally. The inner side of the sliding block 7 defines a guide recess 72 along a longitudinal direction thereof. The top of the sliding block 7 protrudes upward to form two lumps 73. The sliding plate 8 defines a second hole 81 near one side thereof. Both sides of the sliding plate 8 respectively define two openings 82 for mating with the corresponding lumps 73, then the sliding plate 8 is supported and clasped by the two sliding blocks 7.

The pushing component 300 includes a torsion spring 9 and a damping plate 10. The torsion spring 9 has a first elastic arm 91 and a second elastic arm 92. A free end of the first elastic arm 91 defines a first ring 93. A free end of the second elastic arm 92 defines a second ring 94.

Figure 3:
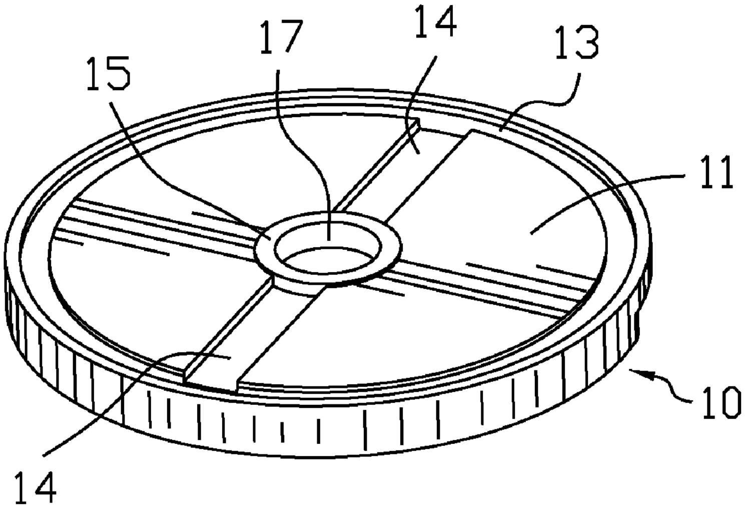
FIG. 3 is a perspective view of a damping plate shown in FIG. 2.
Figure 4:
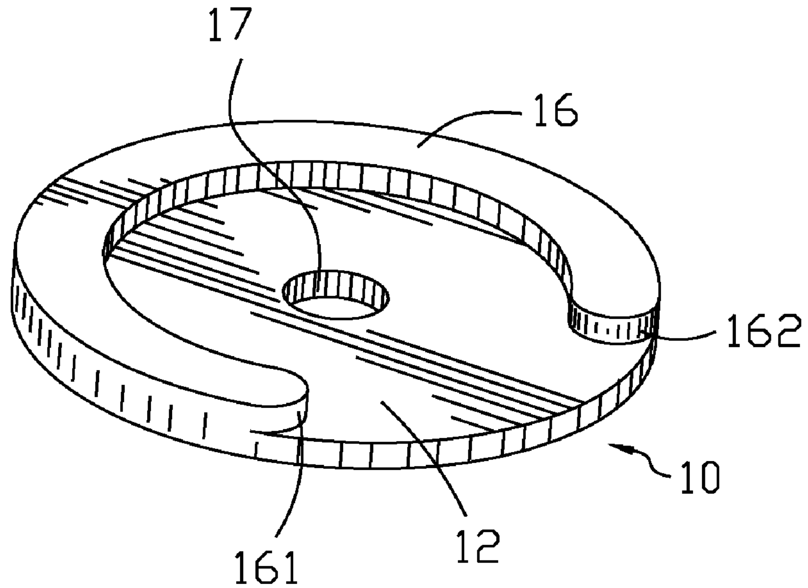
FIG. 4 is another angle perspective view of the damping plate shown in FIG. 3.

Please reference to FIG. 3 and FIG. 4, the damping plate 10 is disc-shaped and defines a top surface 11 and a bottom surface 12. The top surface 11 of the damping plate 10 defines a sealing groove 13 with a ring shape adjacent to the edge thereof. An axis hole 17 is opened at the center of the damping plate 10. The top surface 11 of the damping plate 10 protrudes upward to form a resisting portion 15 around and adjacent to the axis hole 17. The top surface 11 defines a damping recess 14 along a radius direction thereof. The damping recess 14 has two outer ends communicating with the sealing groove 13 and two inner ends. Each of the inner ends of the damping recess 14 has a distance to the axis hole 17 for blocking the damping oil. A stopping portion 16 protrudes downward from the edge of the bottom surface 12 of the damping plate 10. The stopping portion 16 is defined into a ring shape with a gap to form two stopping ends 161, 162.

Please reference to FIGS. 2-5, in assembly, the two sliding blocks 7 are located adjacent two side portions 21 respectively, the guide recess 72 of the sliding block 7 mates with the side portion 21 for guiding the side portion 21 to slide along the guide recess 72. A pair of guide rods 4 are inserted into the respective guide holes 31 of the supporting members 3 and the respective sliding holes 71 of the sliding blocks 7. Two ends of the guide rod 4 respectively have a washer 5 disposed therearound for reducing impact between the sliding block 7 and the supporting member 3.

The sliding plate 8 is over the basic plate 2. The damping plate 10 is placed between the basic plate 2 and the sliding plate 8. Damping oil is poured into the damping recess 14 then flows into the sealing groove 13. A seal 43 is placed in the sealing groove 13 of the damping plate 10, the seal 43 and the resisting portion 15 of the damping plate 10 is against the sliding plate 8 for sealing damping oil overflowed between the top surface 11 of the damping plate 10 and the sliding plate 8. The axle hole 17 of the damping plate 10 is corresponding to the second hole 81 of the sliding plate 8. The second elastic arm 92 is located beneath the bottom surface 12 of the damping plate 10 and between the two stopping ends 161, 162 of the stopping portion 16. The second ring 94 is corresponding to the axle hole 17 of the damping plate 10. A second pivot 42 is provided to pass through the second ring 94 of the torsion spring 9, the axle hole 17 of the damping plate 10 and the second hole 81 in turn for pivotably connecting the damping plate 10 and the second ring 94 to the sliding plate 8. A first pivot 41 is provided to pass through the first ring 93 of the torsion spring 9 and the first hole 22 of the basic plate 2 for pivotably connecting the first ring 93 of the torsion spring 9 to the basic plate 2.

Figure 5:
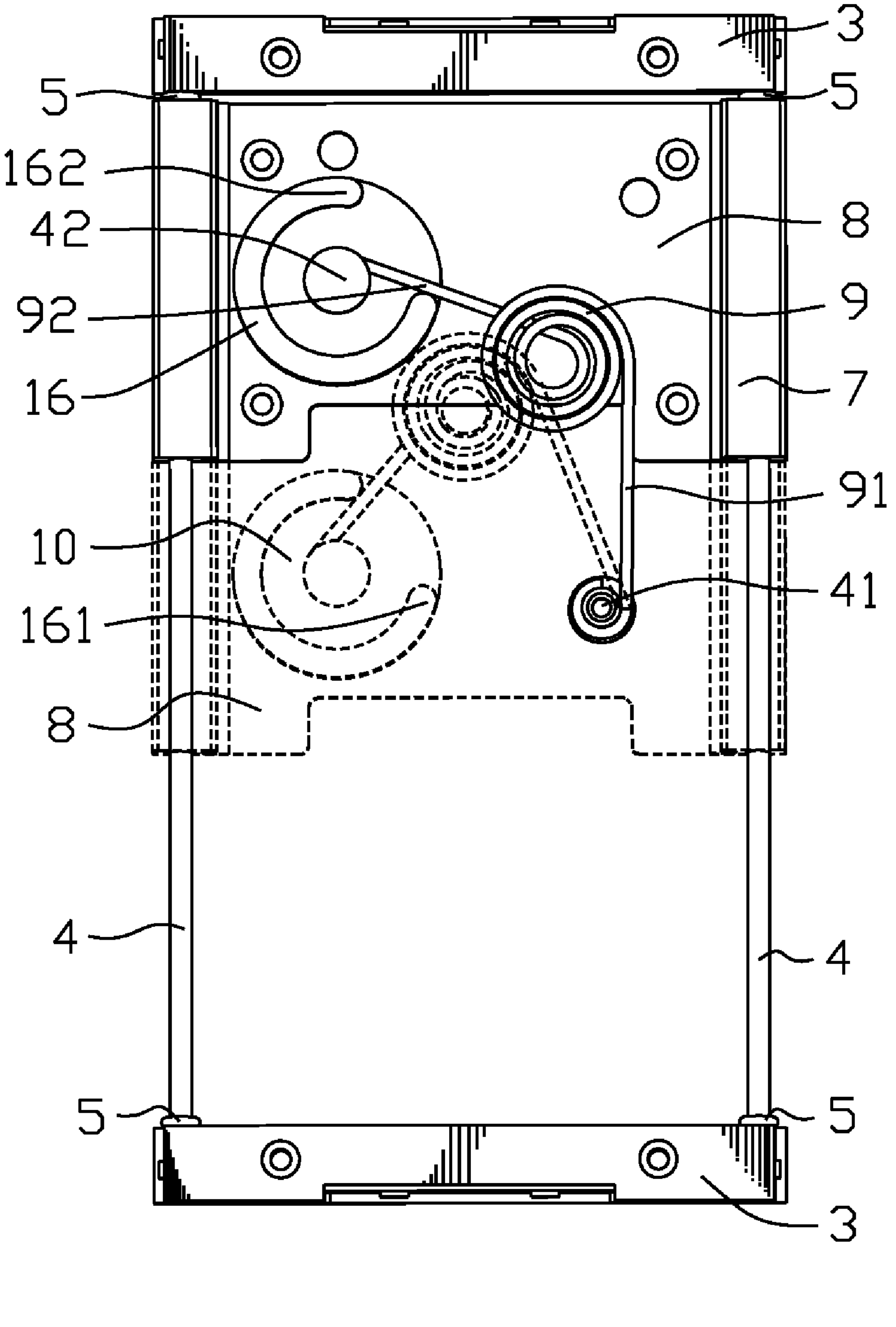
FIG. 5 is a bottom plan view showing an operation process of the sliding hinge from a close status to a middle status in which the torsion spring has a maximum deformation, wherein the basic plate of the sliding hinge is removed.
Figure 6:
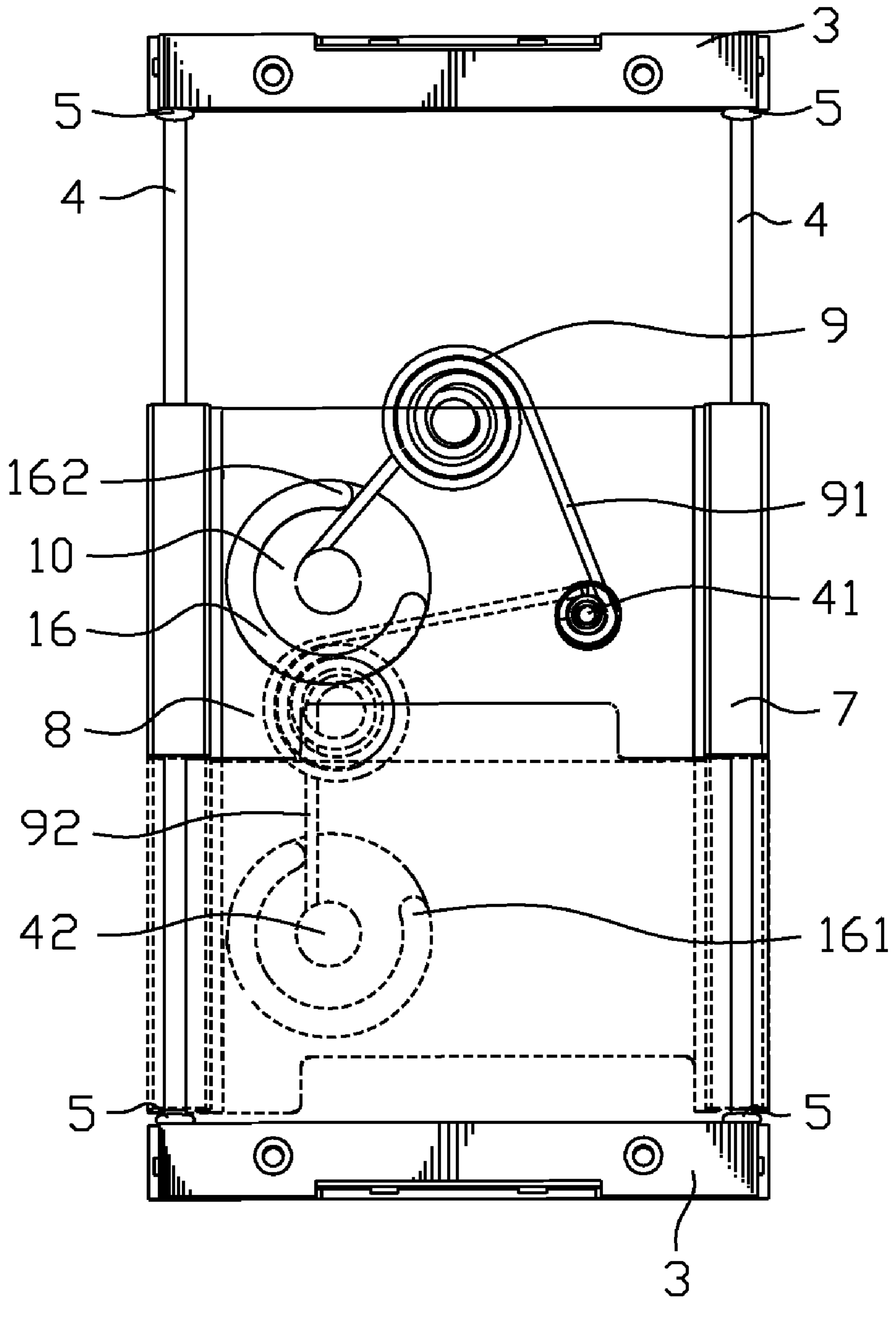
FIG. 6 is a bottom plan view showing an operation process of the sliding hinge from the middle status to an opening status, wherein the basic plate of the sliding hinge is removed.

Please reference to FIG. 5 and FIG. 6, when the slide type electronic device with the sliding hinge is in the close status, the torsion spring 9 is in a non-deformation state. The second elastic arm 92 of the torsion spring 9 is just against the stopping end 161 of the stopping portion 16. As a user slides the upper housing on the lower housing to open the slide type electronic device, a certain level of external force is applied from the user to the upper housing and brings the sliding body 200 to slide forward along the guide rods 4. The first ring 93 and the second ring 94 approaches each other gradually. The second elastic arm 92 gradually moves toward the stopping end 162 of the stopping portion 16. At this process, the stored elastic force of the torsion spring 10 is increased gradually, the damping plate 10 is not rotating because of the adhesive force of the damping oil between the sliding plate 8 and the damping plate 10. When the distance between the first ring 93 and the second ring 94 of the torsion spring 9 is shortest, the stored elastic force of the torsion spring 9 is maximized. At this time, although the user does not slide the upper housing, the first ring 93 and the second ring 94 continue to move forward away from each other gradually by release of the stored elastic force of the torsion spring 9. Meanwhile, the second elastic arm 92 is just against the stopping end 162 of the stopping portion 16, and then pushes the damping plate 10 to rotate around the second pivot 42. But the rotating speed of the damping plate 10 is limited by a damping force produced in the rotating process of the damping plate 10 because of the damping oil filled between the damping plate 10 and the sliding plate 8. Furthermore, the departing speed of the first ring 93 and the second ring 94 of the torsion spring 9 is limited because the second elastic arm 92 is blocked by the stopping portion 16 of the damping plate 10. Then the opening speed of the upper housing from the lowering housing is limited, the slide type electronic device can be opened softly and steadily.

Figure 7:
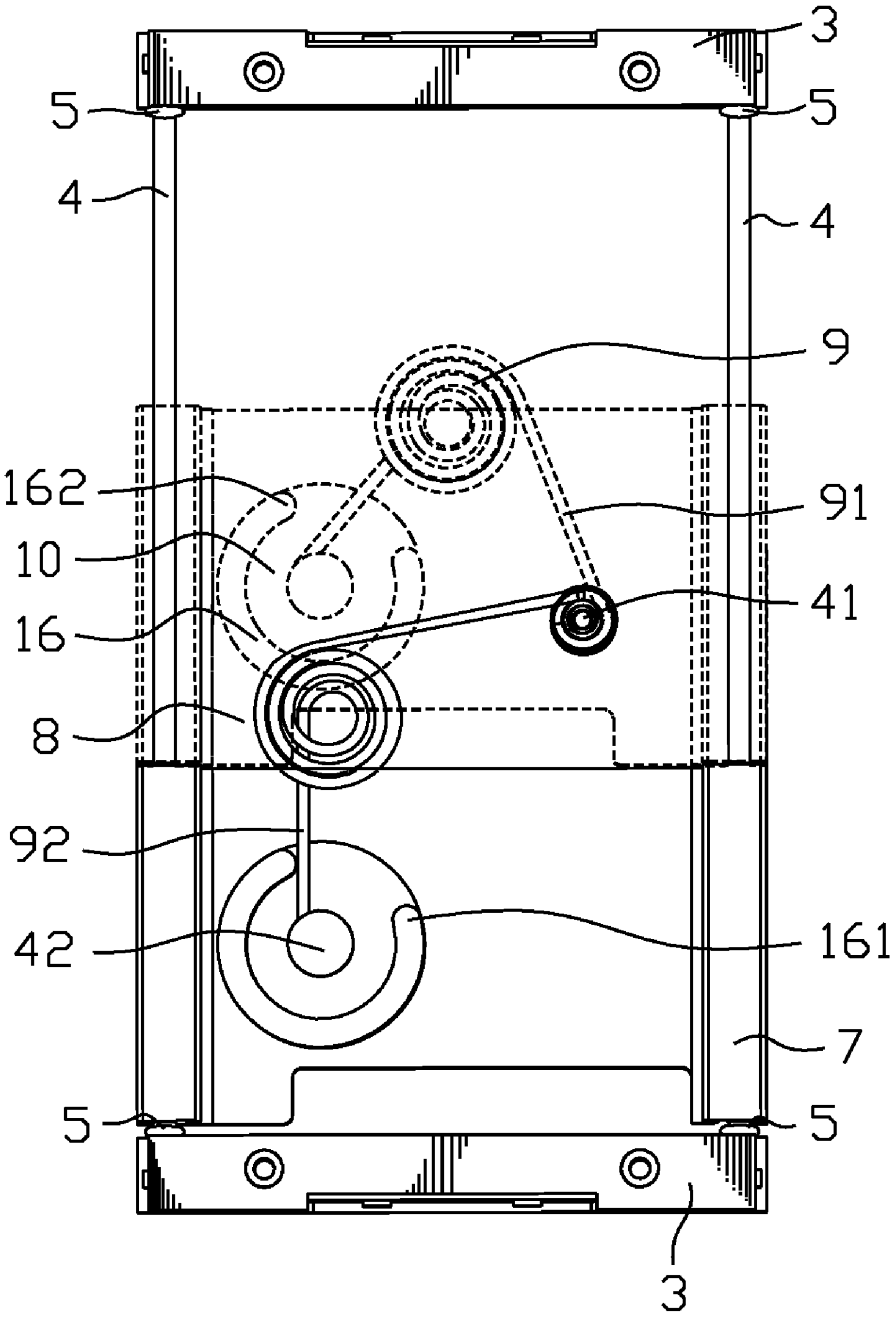
FIG. 7 is a bottom plan view showing an operation process of the sliding hinge from the close status to the middle status, wherein the basic plate of the sliding hinge is removed.
Figure 8:
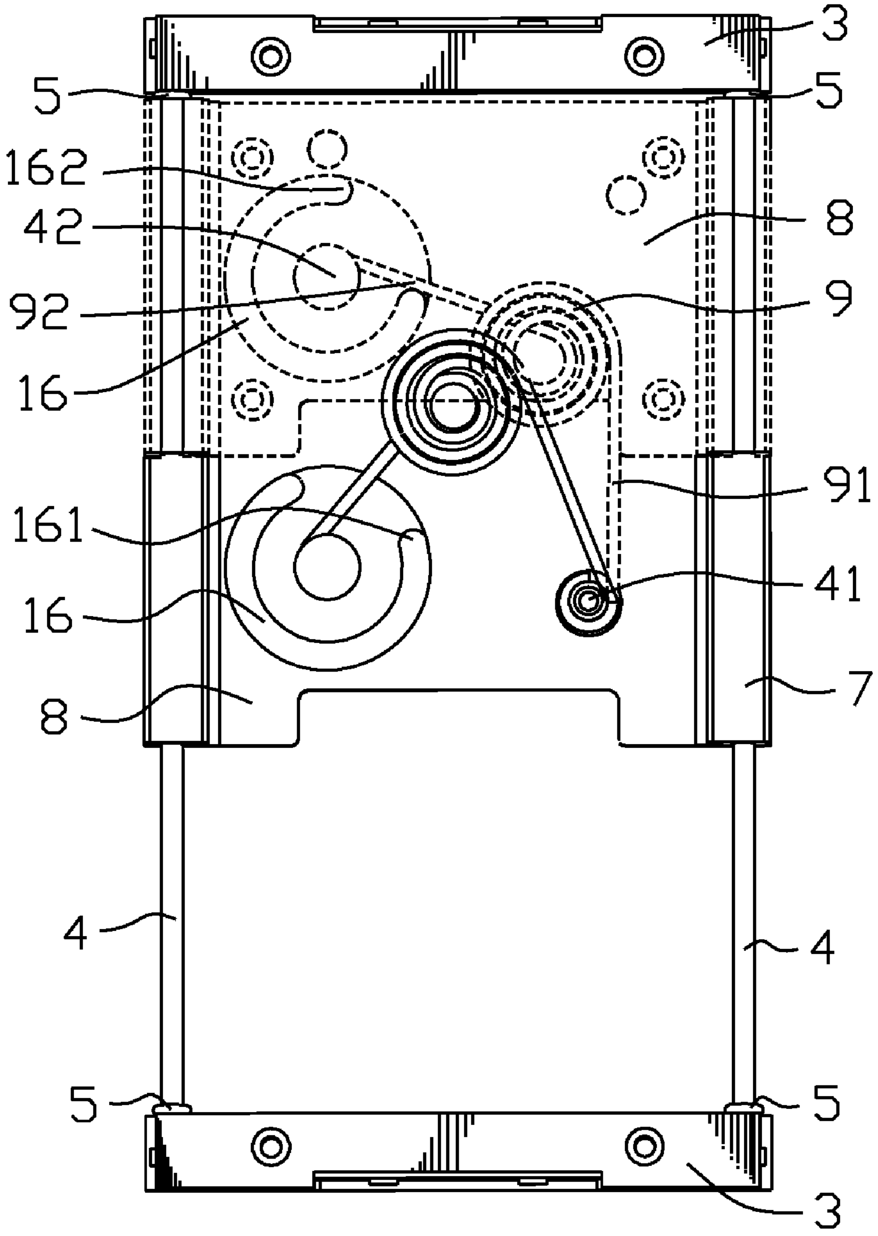
FIG. 8 is a bottom plan view showing an operation process of the sliding hinge from the middle status to the close status, wherein the basic plate of the sliding hinge is removed.

Please reference to FIG. 7 and FIG. 8, when the user slides the upper housing on the lower housing to close the slide type electronic device, a certain level of external force is applied from the user to the upper housing and brings the sliding body 200 to slide backward along the guide rods 4. The first ring 93 and the second ring 94 approaches each other gradually. At this process, the stored elastic force of the torsion spring 10 is increased gradually, the damping plate 10 is not rotating because of the adhesive force of the damping oil between the sliding plate 8 and the damping plate 10. When the distance between the first ring 93 and the second ring 94 of the torsion spring 9 is shortest, the stored elastic force of the torsion spring 9 is maximized. At this time, the second elastic arm 92 approximately moves to the middle of the stopping ends 161, 162. Although the user does not slide the upper housing, the first ring 94 and the second ring 93 continue to move away from each other gradually by release of the stored elastic force of the torsion spring 9, and then the second elastic arm 92 is against the stopping end 161 and pushes the damping plate 10 to rotate around the second pivot 42 until the sliding hinge recovers to the opening status. But the rotating speed of the damping plate 10 is limited by a damping force produced in the rotating process of the damping plate 10 as described above. Then the closing speed of the upper housing from the lowering housing is limited, the slide type electronic device can be closed softly and steadily.

As described above, when the slide type electronic device is opened or closed, the damping plate 10 disposed between the basic plate 2 and the sliding plate 8 is pushed to rotate by the second elastic arm 92. The damping force produced in the rotating process of the damping plate 10 to limit the rotating speed of the damping plate 10, then the movement trend of the torsion spring 9 is limited. Therefore, the slide type electronic device can be opened or closed softly and steadily, avoiding a shock between the upper housing and the lower housing.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A sliding hinge, comprising:

a basic body;

a sliding body slidably coupling with the basic body; and a pushing component placed between the basic body and the sliding body, having a torsion spring and a damping plate, the torsion spring having a first elastic arm and a second elastic arm, a free end of the first elastic arm is pivotably connected to the basic body, a free end of the second elastic arm is pivotably connected to the sliding body, the damping plate is pivotably mounted on the sliding body, the damping plate defining a stopping portion, the stopping portion having two stopping ends alternately engaging with the second elastic arm for providing a damping force to the second elastic arm when a stored elastic force of the torsion spring is released, wherein the damping plate has a top surface which is frictional contact with the sliding body to produce the damping force.

2. The sliding hinge as claimed in claim 1, wherein the damping plate has a bottom surface opposite the top surface, the bottom surface has a portion protruding downward to form the stopping portion.

3. The sliding hinge as claimed in claim 2, wherein the free end of the second elastic arm is placed on the bottom surface of damping plate and located between the two stopping ends of the stopping portion.

4. The sliding hinge as claimed in claim 3, wherein the stopping portion is formed into an arc shape, and a gap is defined between the two stopping ends.

5. The sliding hinge as claimed in claim 1, further comprising damping oil filled between the damping plate and the sliding body.

6. The sliding hinge as claimed in claim 5, wherein the damping plate defines a sealing groove of ring shape in the top surface thereof, a seal ring is placed in the sealing groove and pressed against the sliding plate for sealing the damping oil.

7. The sliding hinge as claimed in claim 6, wherein the damping plate has an axis hole, a resisting portion protrudes around and adjacent to the axis hole for blocking the damping oil flowing into the axis hole.

8. The sliding hinge as claimed in claim 7, wherein the damping plate defines a damping recess along a radius direction thereof, the damping recess has two outer ends communicating with the sealing groove and two inner ends blocked by the resisting portion.

9. The sliding hinge as claimed in claim 1, wherein the free end of the second elastic arm and the damping plate have one and the same rotating axis.

* * * * *